(12) United States Patent
Cheraghi et al.

(10) Patent No.: US 11,496,260 B2
(45) Date of Patent: Nov. 8, 2022

(54) METHODS AND APPARATUS TO FACILITATE DUAL STAGE CHANNEL STATE INFORMATION REFERENCE SIGNAL (CSI-RS) SELECTION FOR CSI FEEDBACK

(71) Applicant: QUALCOMM Incorporated, San Diego, CA (US)

(72) Inventors: Parisa Cheraghi, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 16/449,055

(22) Filed: Jun. 21, 2019

(65) Prior Publication Data

US 2020/0403746 A1 Dec. 24, 2020

(51) Int. Cl.
*H04L 5/00* (2006.01)
*H04W 72/08* (2009.01)

(52) U.S. Cl.
CPC ........... *H04L 5/0048* (2013.01); *H04W 72/08* (2013.01)

(58) Field of Classification Search
CPC .............................. H04L 5/0048; H04W 72/08
See application file for complete search history.

(56) References Cited

U.S. PATENT DOCUMENTS

| | | | |
|---|---|---|---|
| 9,763,177 B1 * | 9/2017 | Baskaran | H04J 11/0076 |
| 2014/0003240 A1 * | 1/2014 | Chen | H04W 4/70 370/235 |

(Continued)

OTHER PUBLICATIONS

Intel Corporation: "Summary 3 on SCell BFR and L1-SINR", 3GPP Draft, 3GPP TSG RAN WG1 Meeting #96b, R1-1905844, Summary on SCell BFR and L1-SINR_V7, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019 Apr. 15, 2019 (Apr. 15, 2019), XP051707890, pp. 1-23, Retrieved from the Internet: URL:http://www.3gpp.org/ftp/tsg&5Fran/WG1%5FRL1/TSGR1%5F96b/Docs/R1%2D1905844%2Ezip [retrieved on Apr. 15, 2019] Section 1, 2.1, 3.1.

(Continued)

*Primary Examiner* — Jasper Kwoh
(74) *Attorney, Agent, or Firm* — Arent Fox LLP/Qualcomm Incorporated

(57) ABSTRACT

Apparatus, methods, and computer-readable media for facilitating dual stage CSI selection for CSI feedback are disclosed herein. An example method of wireless communication at a UE includes, after detecting a CSI report triggering event, selecting a subset of CSI-RS resources from a set of CSI-RS resources configured for the UE by applying at least one of an RSRP threshold or an SINR threshold to each CSI-RS resource of the set of CSI-RS resources. The example method also includes selecting a CSI-RS resource from the subset of CSI-RS resources based on an efficiency metric associated with each of the CSI-RS resources of the subset of CSI-RS resources. The example method also includes transmitting a CSI report to a base station, the CSI report including a CQI associated with the selected CSI-RS and at least one of a PMI, an RI, or a wideband component of the PMI.

30 Claims, 8 Drawing Sheets

(56) References Cited

U.S. PATENT DOCUMENTS

| | | | |
|---|---|---|---|
| 2014/0177601 A1* | 6/2014 | Nishio | H04W 52/146 |
| | | | 370/332 |
| 2014/0287692 A1* | 9/2014 | Gunnarsson | H04W 24/10 |
| | | | 455/67.11 |
| 2017/0331535 A1* | 11/2017 | Wei | H04B 7/0478 |
| 2018/0042028 A1* | 2/2018 | Nam | H04B 7/0626 |
| 2018/0219664 A1 | 8/2018 | Guo et al. | |
| 2018/0227031 A1* | 8/2018 | Guo | H04B 7/0695 |
| 2018/0279145 A1 | 9/2018 | Jung et al. | |
| 2019/0014559 A1* | 1/2019 | Davydov | H04L 5/0094 |
| 2019/0059013 A1* | 2/2019 | Rahman | H04B 7/0695 |
| 2019/0281487 A1* | 9/2019 | Liu | H04W 24/10 |
| 2020/0229002 A1* | 7/2020 | Kaikkonen | H04W 56/001 |
| 2020/0288479 A1* | 9/2020 | Xi | H04B 7/02 |
| 2020/0396632 A1* | 12/2020 | Ramachandra | H04L 5/0048 |

OTHER PUBLICATIONS

International Search Report and Written Opinion—PCT/US2020/037605—ISA/EPO—dated Mar. 25, 2021.

\* cited by examiner

METHODS AND APPARATUS TO FACILITATE DUAL STAGE CHANNEL STATE INFORMATION REFERENCE SIGNAL (CSI-RS) SELECTION FOR CSI FEEDBACK

BACKGROUND

Technical Field

The present disclosure relates generally to communication systems, and more particularly, to channel state feedback procedures.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra-reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A channel state feedback procedure may include a first device (e.g., a user equipment (UE)) receiving a set of channel state information reference signals (CSI-RS) from a second device (e.g., a base station) and transmitting a CSI-RS resource indicator (CRI) report to the second device including, for example, channel conditions for the reference signals received at the first device. In some examples, the first device may select a CRI from the set of received CSI-RS resources, for example, to use for scheduling a transmission (e.g., during beam forming). Thus, accurate selection of the best CSI-RS resource may be beneficial, especially as the quantity of CSI-RS resources included in a set of CSI-RS resources may increase. However, the techniques for selecting the CSI-RS resource may be costly in terms of resources usage, such as increased power consumption and/or increased workloads.

Example techniques disclosed herein facilitate dual stage CSI selection for CSI feedback. For example, techniques disclosed herein facilitate identifying a subset of CSI-RS resources configured for a UE. In some examples, the identifying of the subset of CSI-RS resources may include comparing RSRP measurements associated with each of the CSI-RS resources and identifying those CSI-RS resources associated with RSRP measurements that satisfy an RSRP threshold. In some examples, the identifying of the subset of CSI-RS resources may additionally or alternatively include comparing SINR measurements associated with each of the CSI-RS resources and identifying those CSI-RS resources associated with SINR measurements that satisfy an SINR threshold. Those CSI-RS resources with measurements that do not satisfy the RSRP threshold and/or the SINR threshold are discarded from further processing with respect to CSI selection. By discarding the respective CSI-RS resources, techniques disclosed herein may increase power/cycle savings without introducing performance degradation. For example, example techniques facilitate identifying the best CSI-RS resource by discarding those CSI-RS resources with RSRP measurements and/or SINR measurements that do not satisfy the respective RSRP threshold and/or SINR threshold and, thus, reducing the quantity of CSI-RS resources that may be candidates for the best CSI-RS resource.

In an aspect of the disclosure, a method, a computer-readable medium, and an apparatus are provided. An example apparatus for wireless communication at a UE includes, after detecting a CSI report triggering event, selecting a subset of CSI-RS resources from a set of CSI-RS resources configured for the UE by applying at least one of a RSRP threshold or an SINR threshold to each CSI-RS resource of the set of CSI-RS resources. The example apparatus also selects a CSI-RS resource from the subset of CSI-RS resources based on an efficiency metric associated with each of the CSI-RS resources of the subset of CSI-RS resources. The example apparatus also transmits a CSI report to a base station, the CSI report including a channel quality indicator (CQI) associated with the selected CSI-RS and at least one of a precoding matrix indicator (PMI), a rank indication (RI), and a wideband component of the PMI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
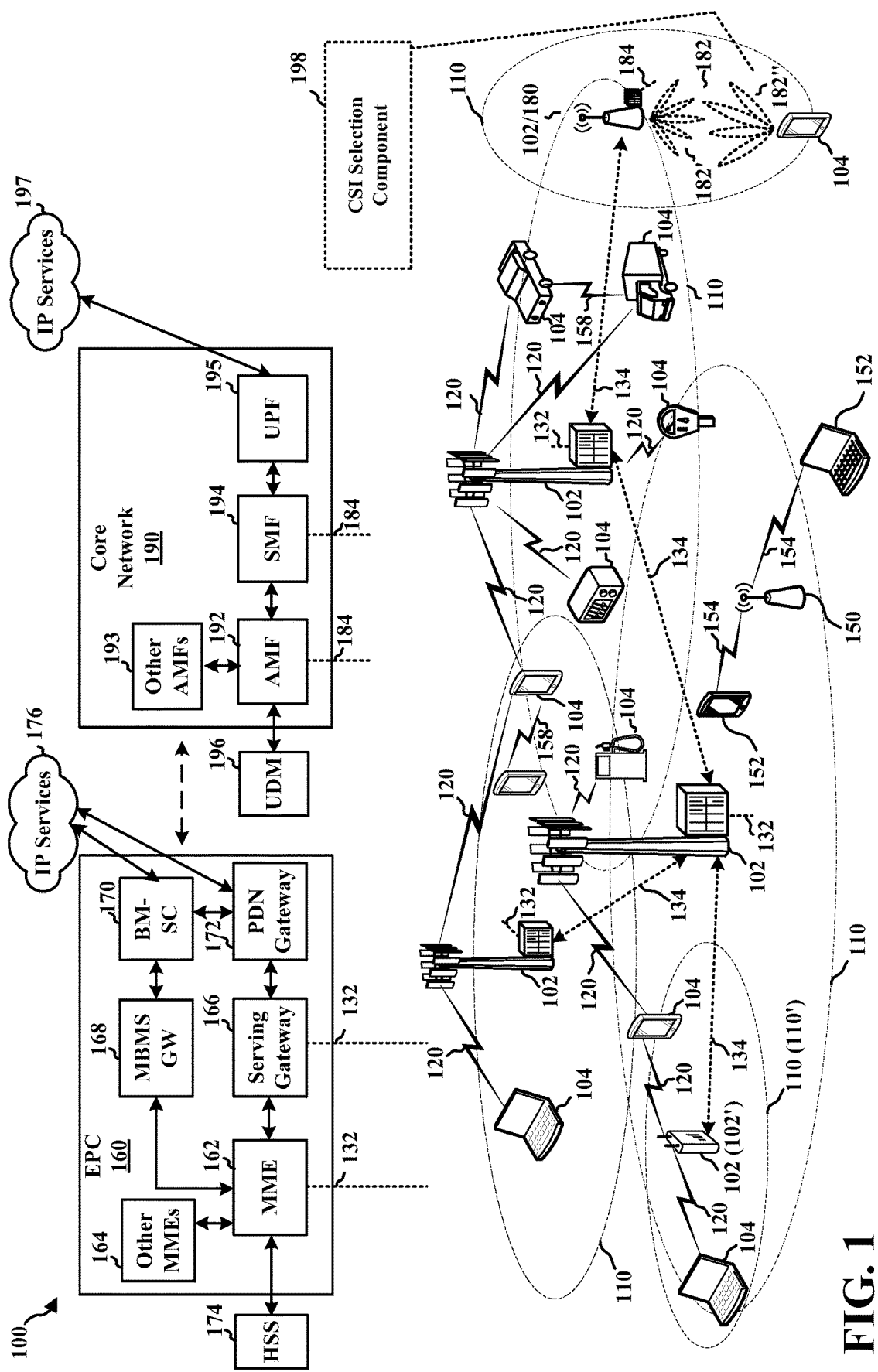
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via CSI selection. As an example, in FIG. 1, the UE 104 may include a CSI selection component 198 configured to, after detecting a CSI report triggering event, select a subset of CSI-RS resources from a set of CSI-RS resources configured for the UE by applying at least one of an RSRP threshold or an SINR threshold to each CSI-RS resource of the set of CSI-RS resources. The example CSI selection component 198 may also be configured to select selecting a CSI-RS resource from the subset of CSI-RS resources based on an efficiency metric associated with each of the CSI-RS resources of the subset of CSI-RS resources. The example CSI selection component 198 may also be configured to transmit a CSI report to a base station, the CSI report including a CQI associated with the selected CSI-RS and at least one of a PMI, an RI, and/or a wideband component of the PMI.

Although the following description may provide examples based on NR channel state feedback, it should be appreciated that the concepts described herein may be applicable to other communication technologies. For example, the concepts described herein may be applicable to LTE, LTE-A, CDMA, GSM, and/or other wireless technologies (or RATs) in which a resource is selected from a set of resources for transmitting an uplink transmission.

Furthermore, it should be appreciated that the following description may provide examples directed to non-RSRP based reports. For example, CSI reports may be RSRP-based reports or non-RSRP based reports. Example disclosed herein are directed towards non-RSRP based reports and, thus, the reports may include a CQI-based parameter.

Figure 2:
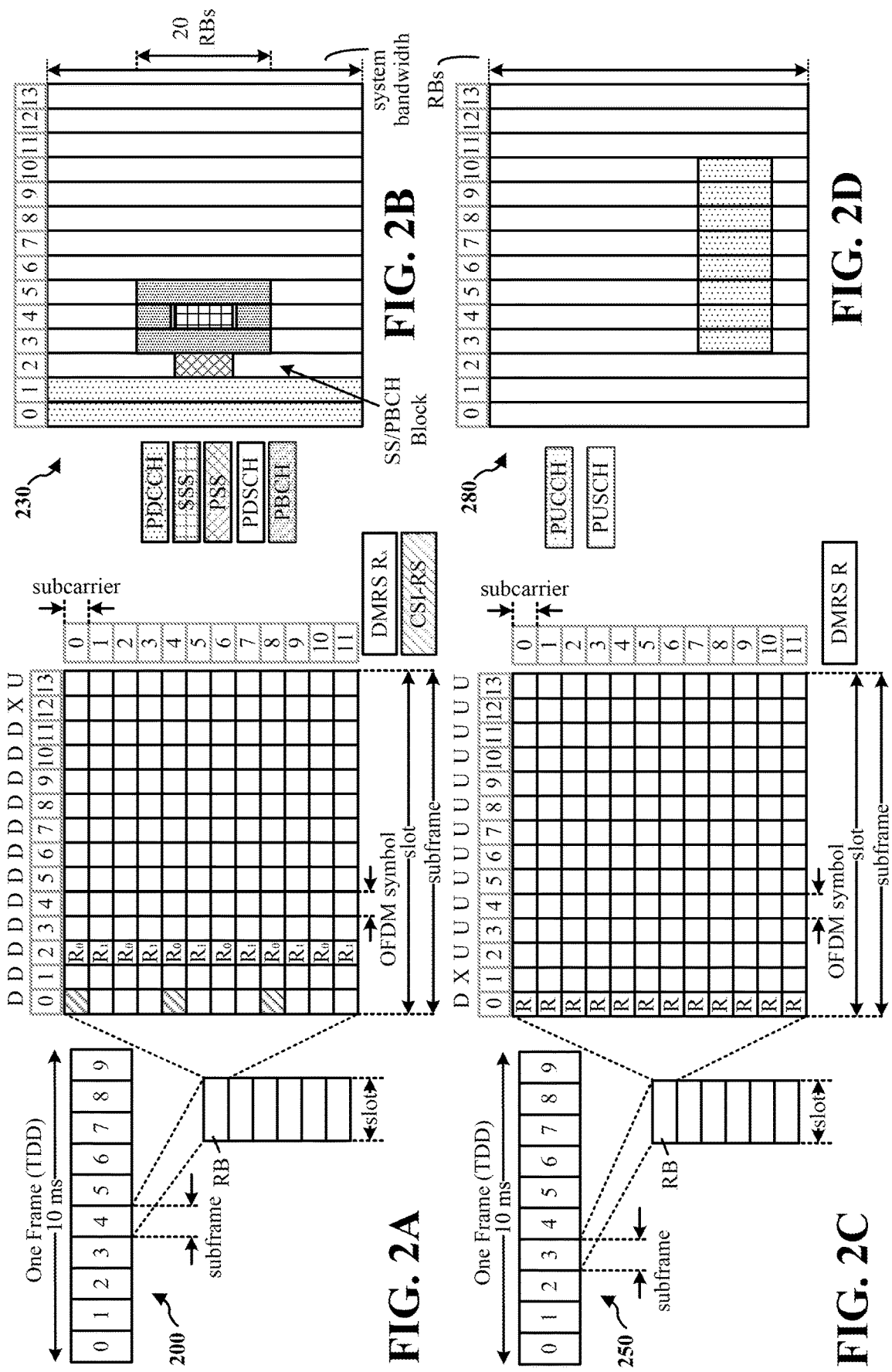
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A to 2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
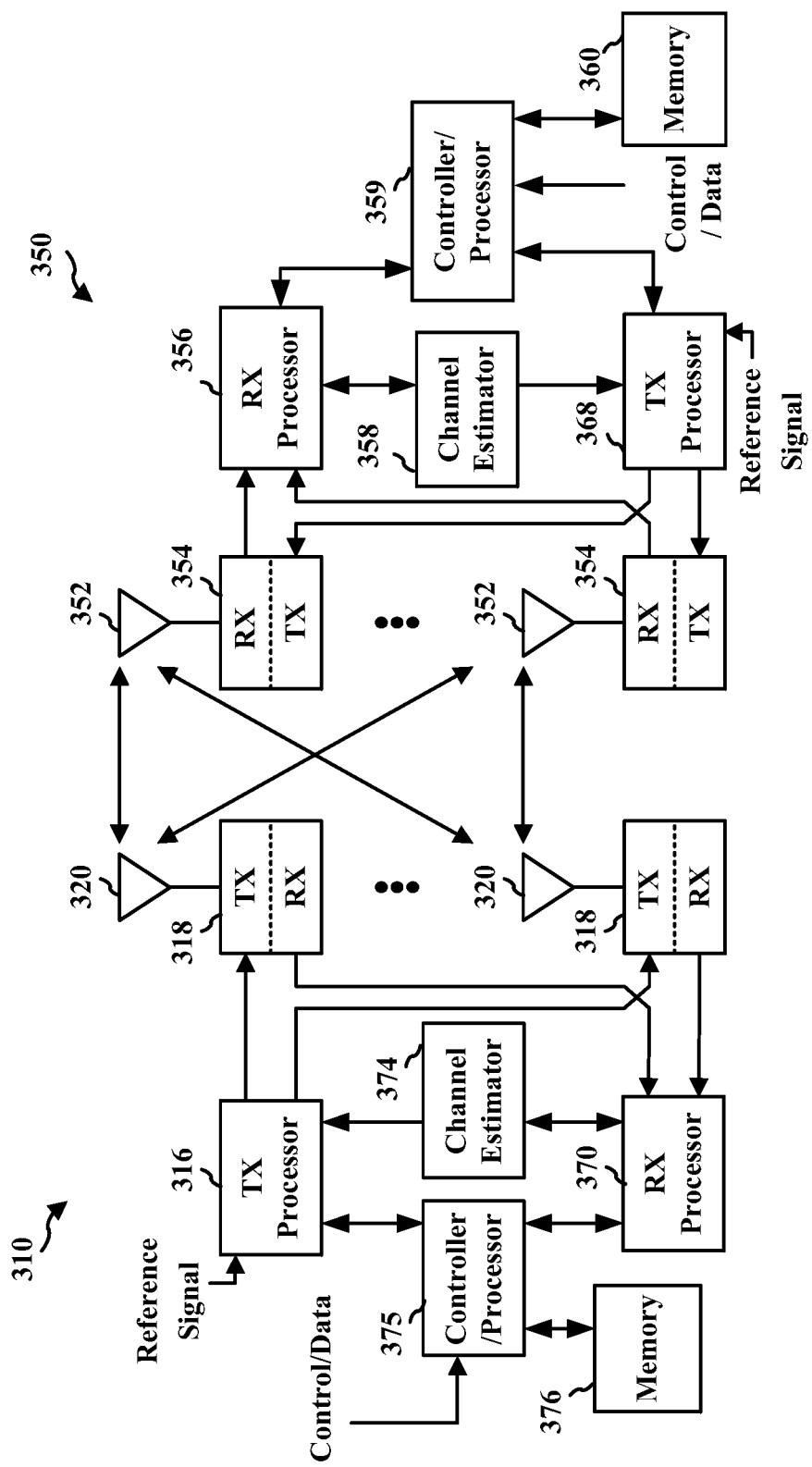
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with the CSI selection component 198 of FIG. 1.

In response to receiving a CSI-RS, a UE may measure various radio channel conditions and report the measurements to a base station (e.g., may perform the channel state feedback procedure). For example, after receiving the CSI-RS, the UE may generate a CSI report including one or more components, such as CQI, a PMI, a CSI-RS resource indicator (CRI), a strongest layer indication (SLI), and/or an L1-RSRP (e.g., for beam management). In some examples, the generating (or triggering) of the CSI report may be associated with the receiving of certain reference signals. For example, a UE receiving at least one of a non-zero power CSI-RS for a channel measurement resource (CMR), a CSI interference measurement (CSI-IM) for an interference measurement resource (IMR), or a non-zero power CSI-RS for an interference measurement resource may cause the UE to generate a CSI report. In some examples, when a resource set for CMR includes more than one CSI-RS resource, the UE may report a CRI along with one or more parameters configured in the report via RRC. For example, the UE may determine which resource is the best resource and report the determined resource back to the base station.

In some examples, the UE may calculate the CSI parameters based on one or more dependencies associated with the CSI parameters. For example, the UE may calculate the RI based on the reported CRI. The UE may calculate the PMI based on the reported RI and CRI. The UE may calculate the CQU based on the reported PMI, RI, and CRI. The UE may calculate the L1-RSRP based on the reported CQI, PMI, RI, and CRI.

When a UE is configured with one resource, the UE can use that resource for transmitting an uplink transmission. However, when the UE is configured with a set of resources, then it may become beneficial for the UE to select a best resource from the set of resources. For example, with respect to beam forming management, a UE may be configured with a set of resources from which the UE may select a best resource (or best beam) and then provide a CSI report for that resource. From the UE perspective, it is increasingly beneficial to correctly select the best resource, otherwise the UE may be scheduled on the wrong resource and the UE may not be able to achieve its highest throughput.

Example techniques disclosed herein are directed towards CSI selection for no-RSRP based reports. For example, disclosed techniques may facilitate CSI selection for resources that include a CQI-based parameter.

A UE may be configured with multiple resources in a set of resources. For example, in NR, a UE may be configured with up to eight resources in a set of resources. As described above, it may be beneficial for the UE to quickly and correctly determine (or select) the best resource from the set of resources. In some examples, the best resource may be selected based on calculated spectral efficiencies for each of the resources. Furthermore, CSI reporting is a complex process due to, for example, PMI selection. Thus, calculating spectral efficiencies for each of the resources and/or determining CSI reports for each of the resources may be a costly operation in terms of power/cycle resources. Accordingly, rather than calculating spectral efficiencies (and/or determining CSI reports) for each resource, example techniques disclosed herein utilize a sub-selection process that discards resources from further consideration as the best resource without having to calculate the spectral efficiency for the resource (and/or determining a CSI report). By performing the sub-selection process, the quantity of resources that remain for calculating spectral efficiency (and/or determining CSI reports) may be reduced, thereby conserving power/cycles resources of the UE. Furthermore, by discarding those resources that do not satisfy thresholds associated with the sub-selection processing reduces unnecessary processing and without compromising performance.

Figure 4:
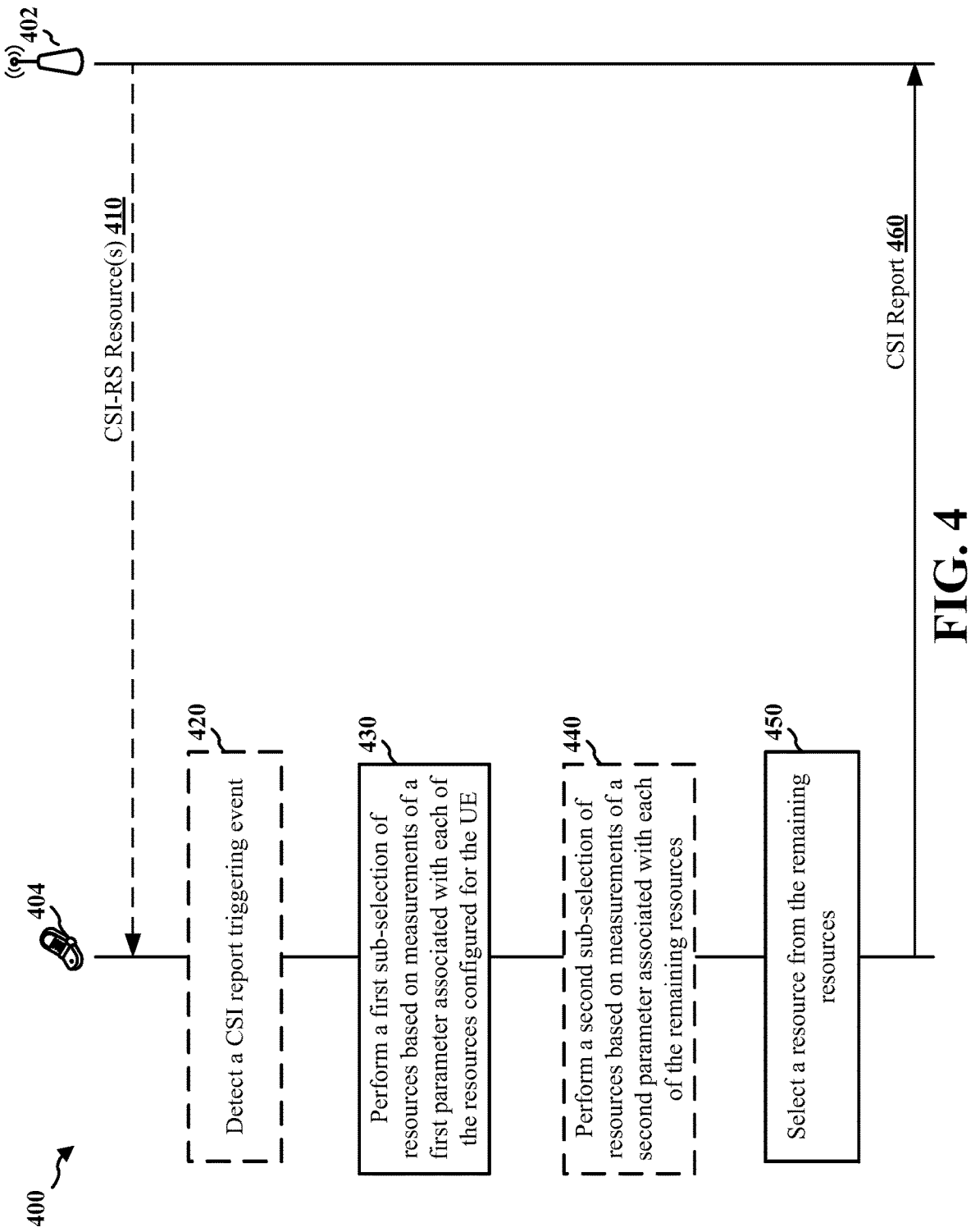
FIG. 4 is an example communication flow between a base station and a UE, in accordance with the teachings disclosed herein.

FIG. 4 illustrates an example wireless communication 400 between a base station 402 and a UE 404, as presented herein. One or more aspects of the base station 402 may be implemented by the base station 102/180 of FIG. 1 and/or the base station 310 of FIG. 3. One or more aspects of the UE 404 may be implemented by the UE 104 of FIG. 1 and/or the UE 350 of FIG. 3.

It should be appreciated that while the wireless communication 400 includes one base station 402 in communication with one UE 404, in additional or alternative examples, the base station 402 may be in communication with any suitable quantity of UEs 404 and/or base stations 402, and/or the UE 404 may be in communication with any suitable quantity of base stations 402 and/or UEs 404. Furthermore, while the wireless communication 400 includes a channel state feedback procedure between the base station 402 and the UE 404, it should be appreciated that in other examples, the wireless communication 400 may include additional or alternative feedback procedures.

In the illustrated example, the UE 404 may receive CSI-RS resource(s) 410 from the base station 402. In some examples, the CSI-RS resource(s) 410 may include a set of resources configured for the UE 404. In some examples, the CSI-RS resource(s) may include a non-zero power CSI-RS for CMR, a CSI-IM for IMR, and/or a non-zero power CSI-RS for IMR. In some examples, the non-zero power CSI-RS for IMR may applicable to aperiodic CSI (A-CSI).

At 420, the UE 404 may detect a CSI report triggering event. In some examples, the CSI report triggering event may be the receiving of the non-zero power CSI-RS for CMR, the CSI-IM for IMR, and/or the non-zero power CSI-RS for IMR. In some examples, the CSI report triggering event may include determining that the UE 404 is configured with more than one resource.

At 430, the UE 404 performs a first sub-selection of resources based on measurements of a first parameter associated with each of the resources configured for the UE 404. For example, for each resource configured for the UE 404, the UE 404 may measure a first parameter and compare the measured parameter to a parameter threshold. The UE 404 may then discard those resources that do not satisfy the parameter threshold. For example, those resources with a measured parameter that is less than the parameter threshold may be discarded from further processing for CSI selection.

At 440, the UE 404 may perform a second sub-selection of resources based on measurements of a second parameter associated with each of the resources remaining after the first sub-selection of resources. For example, for each resource remaining after the first sub-selection (at 430), the UE 404 may measure a second parameter and compare the measured second parameter to a second parameter threshold. The UE 404 may then discard those resources that do not satisfy the second parameter threshold. For example, those resources with a measured second parameter that is less than the second parameter threshold may be discarded from further processing for CSI selection.

At 450, the UE 404 selects a resource from the remaining resources. For example, after performing the first sub-selection (at 430) and the second sub-selection (at 440), the remaining resources (e.g., those resources not discarded during the respective sub-selections 430, 440) may be processed and a best resource may be selected from the remaining resources. In some examples, the UE 404 may determine the best resource based on a calculated measurement associated with each of the remaining resources. For example, the UE 404 may calculate a spectral efficiency for each of the remaining resources and select the resource associated with the highest spectral efficiency. However, it should be appreciated that other techniques for selecting the best resource from the remaining resources may additionally or alternatively be used. The UE 404 may then generate and transmit a CSI report 460 associated with the selected resource to the base station 402.

In some examples, the performing of the first sub-selection, at 430, may be associated with the RSRP parameter. For example, the UE 404 may measure the RSRP of the respective resources and discard those resources that do not satisfy an RSRP threshold. In some examples, the RSRP threshold may be a dynamic threshold that varies based on channel characteristics. In some examples, the RSRP threshold may be based on a ratio (or percentage) of the total received power associated with the resources. For example, the UE 404 may calculate a total received power by summing the RSRP for each of the resources. The UE 404 may then determine the RSRP threshold as a percentage of the total received power. Those resources with an RSRP that does not satisfy the RSRP threshold (e.g., an RSRP that is not greater than or equal to the RSRP threshold) may be discarded from further consideration for resource selection. In some examples, the RSRP threshold may be based on a percentage of a maximum RSRP of the resources. For example, the UE 404 may determine the maximum RSRP of the RSRP measurements for each of the resources and then determine the RSRP threshold as a percentage of the maximum RSRP. It should be appreciated that other techniques for determining the RSRP threshold may additionally or alternatively be used.

It should be appreciated that in some examples, no resources may be discarded at the first sub-selection. For example, when each of the resources is experiencing approximately the same RSRP, then, in some examples, the UE 404 may not discard any of the resources. As each resource is associated with approximately the same RSRP in the above example, then each resource may be considered the best resource and, thus, should not be discarded from further consideration for resource selection (at 450).

It should be appreciated that the cost (in terms of cycles or power resources) for measuring the RSRP for each of the resources may be negligible as measuring the RSRP is included in the channel state feedback procedure and, thus, is not an added cost.

In some examples, the performing of the second sub-selection, at 440, may be associated with the SINR parameter. For example, the UE 404 may measure the SINR of the respective resources and discard those resources that do not satisfy an SINR threshold. In some examples, the SINR threshold may be a dynamic threshold that varies based on channel characteristics. In some examples, the SINR threshold may be based on a ratio (or percentage) of the highest measured SINR of the resources. For example, the UE 404 may determine the maximum SINR of the SINR measurements for each of the resources and then determine the SINR threshold as a percentage of the maximum SINR. It should be appreciated that other techniques for determining the SINR threshold may additionally or alternatively be used.

In some examples, the measured SINR may be based on the selecting of the PMI for the report. For example, the PMI may include a wideband component and a subband component. The determining of the wideband component may include a determination of the SINR. For example, in some examples, the UE 404 may determine the wideband component based on, for example, DFT indices associated with angular directions and DFT beams. In such examples, a rank 1 equivalent SINR may be used for each of the resources. In certain such examples, the rank 1 equivalent SINR may provide relatively fine resolution as the metric may correspond to the wideband component of the precoder matrix (e.g., for PMI selection).

It should be appreciated that in some examples, no resources may be discarded at the second sub-selection. For example, when each of the resources is experiencing approximately the same SINR, then, in some examples, the UE 404 may not discard any of the resources. As each resource is associated with approximately the same, or a similar, SINR in the above example, then each resource may be considered the best resource and, thus, should not be discarded from further consideration for resource selection (at 450).

It should be appreciated that the cost (in terms of cycles or power resources) for measuring the SINR for each of the resources may be negligible as measuring the SINR is included in the channel state feedback procedure (e.g., as part of determining the PMI) and, thus, is not an added cost.

It should be appreciated that while the above description provides examples directed towards performing the second sub-selection based on the SINR parameter, in other examples, the second sub-selection may be based on a signal to noise ratio (SNR) parameter.

It should be appreciated that while the above description associates performing the first sub-selection, at 430, with the RSRP parameter and associates performing the second sub-selection, at 440, with the SINR parameter, the respective parameters may be switched. For example, the performing of the first sub-selection, at 430, may be associated with the RSRP parameter and the performing of the second sub-selection, at 440, may be associated with the SINR parameter.

In some examples, the selecting, at 450, of the resource from the remaining resources may be based on an efficiency metric, such as a spectral efficiency or capacity. In some examples, the UE 404 may calculate a spectral efficiency for each of the resources remaining after performing the sub-selection(s) and select the resource associated with the highest spectral efficiency. The UE 404 may then map the respective spectral efficiency to a CQI for the selected resource for transmitting in the CSI report 460.

Figure 5:
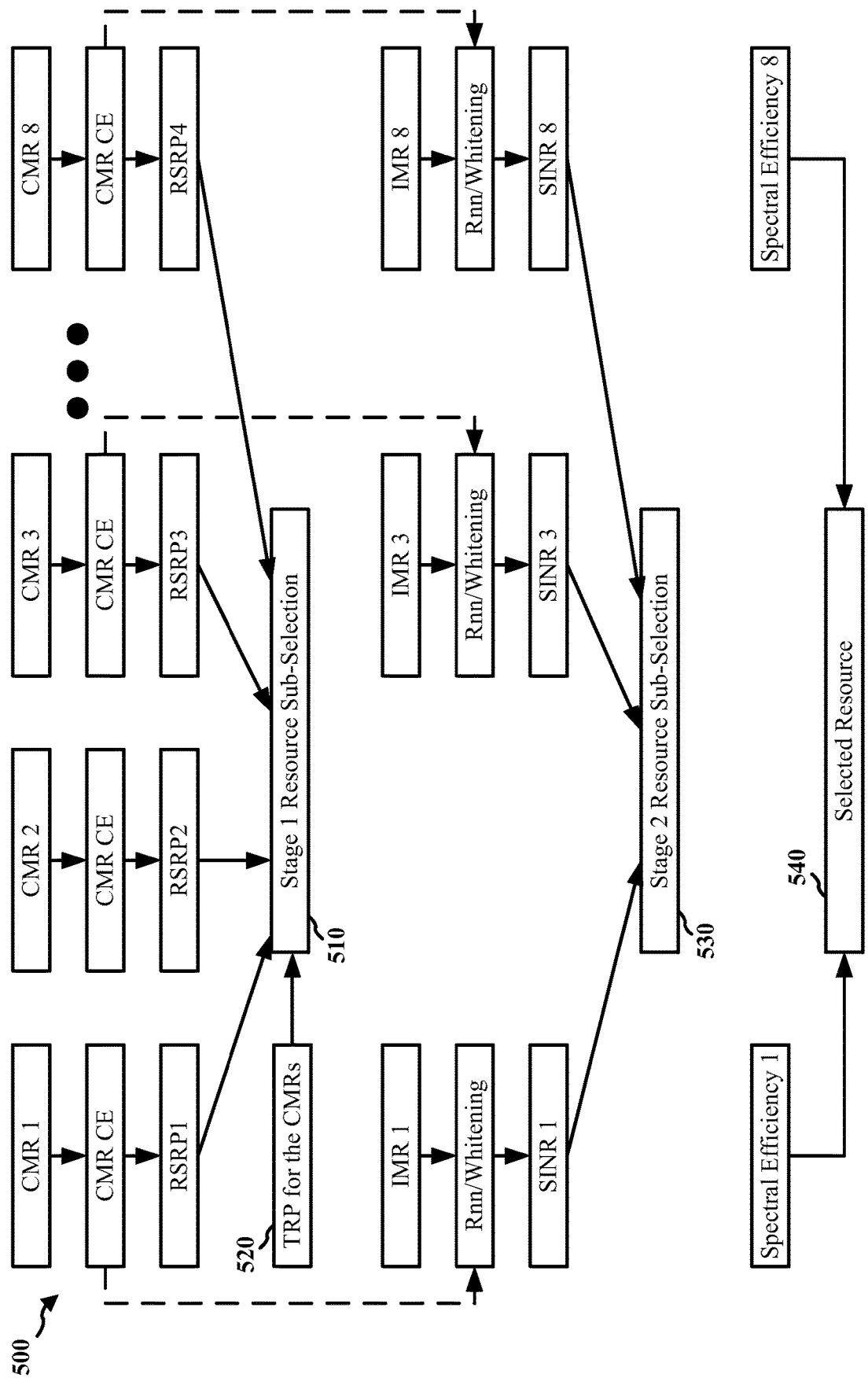
FIG. 5 is an example illustration depicting dual-stage CSI selection for CSI feedback, in accordance with the teachings disclosed herein.

FIG. 5 depicts an example illustration 500 of the dual stage CSI selection for CSI feedback, as disclosed herein. The example dual stage CSI selection may be performed by a UE, such as the UE 104 of FIG. 1, the UE 350 of FIG. 3, and/or the UE 404 of FIG. 4. In the illustrated example, the UE is configured with eight CMRs and the UE is tasked with selecting the best CMR from the eight CMRs. It should be appreciated that while the following example provides eight CMRs that are configured for the UE and are available for selection, in other examples, any suitable quantity of CMRs may be configured for the UE and/or processed for selection.

In the illustrated example, the UE performs a stage 1 resource sub-selection 510 based on the RSRP parameter. For example, for each of the eight CMRs, the UE may perform a channel estimation (CMR CE) and determine a respective RSRP. The UE may also receive and/or calculate a total received power (TRP) for the CMRs 520. In some examples, the TRP 520 may be the sum of the RSRPs for the eight CMRs. To perform the stage 1 resource sub-selection 510, the UE may compare the respective RSRP measurements to an RSRP threshold. The UE may then discard those resources with a respective RSRP measurement that did not satisfy the RSRP threshold.

In the illustrated example of FIG. 5, the UE determines that the first resource (CMR 1), the third resource (CMR 3), and the eight resource (CMR 8) satisfied the RSRP threshold and discards the rest of the resources from further consideration for selection.

The UE then performs a stage 2 resource sub-selection 530 based on the SINR parameter for those resources remaining after the stage 1 resource sub-selection 510 (e.g., CMR 1, CMR 3, and CMR 8). For example, for each of the three remaining resources, the UE may perform channel whitening (e.g., a Rnn/Whitening procedure) on the corresponding CMR channel estimate to determine a respective SINR. To perform the stage 2 resource sub-selection 530, the UE may compare the respective SINR measurements to an SINR threshold. The UE may then discard those resources with a respective SINR measurement that did not satisfy the SINR threshold.

In the illustrated example of FIG. 5, the UE determines that that first resource (CMR 1) and the eight resource (CMR 8) satisfied the SINR threshold and discards the third resource (CMR 3) from further consideration for selection.

The UE then selects a resource 540 from the remaining resources (e.g., CMR 1 and CMR 8). For example, the UE may calculate a spectral efficiency for each of the two resources and select the resource with the highest spectral efficiency.

As shown above in the illustrated example of FIG. 5, the disclosed techniques enable the UE to discard certain of the resources prior to calculating a spectral efficiency. Accordingly, the disclosed techniques enable the UE to conserve power/cycle resources when selecting a resource for reporting.

Figure 6:
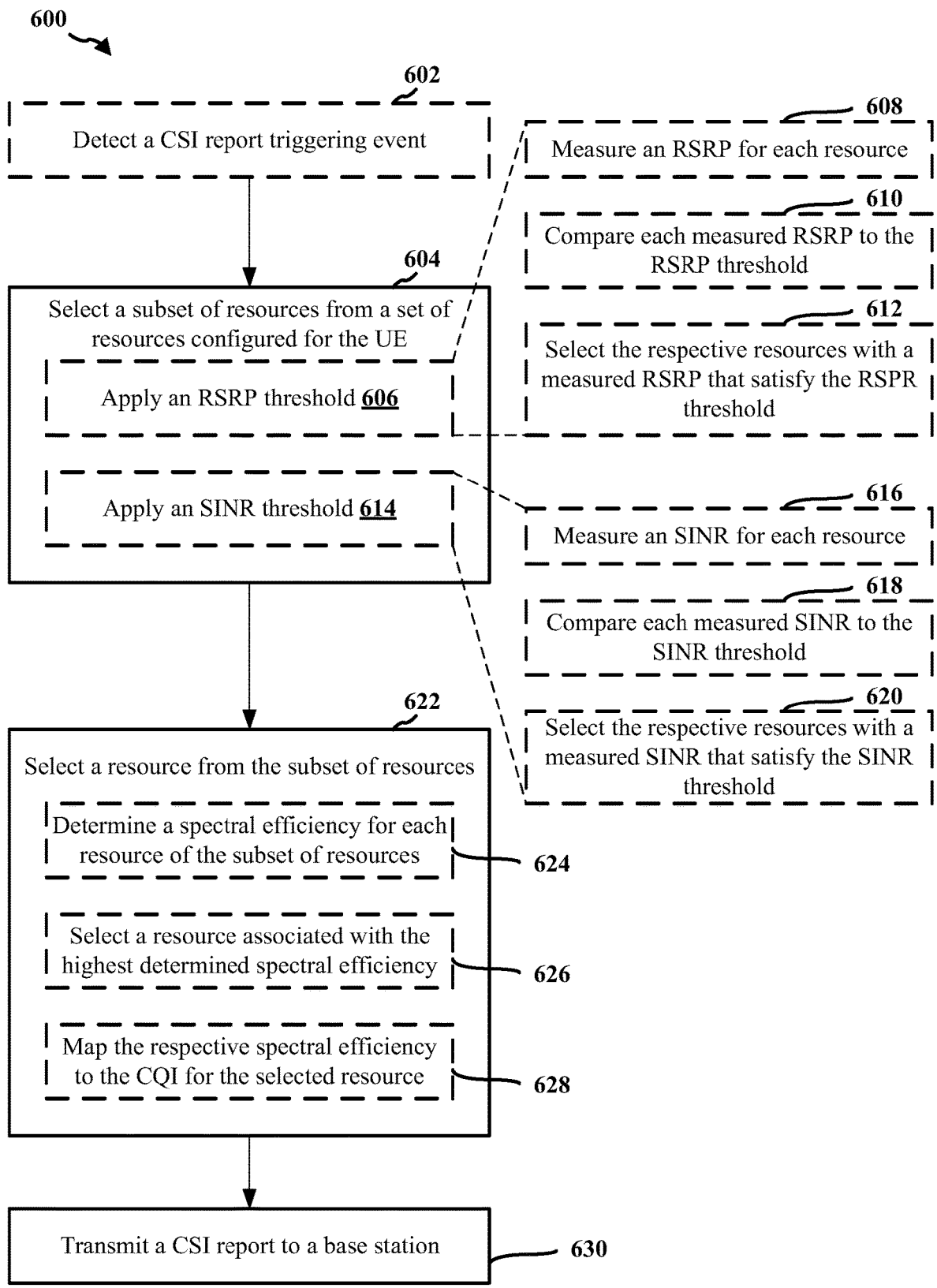
FIG. 6 is a flowchart of example methods of wireless communication at a UE, in accordance with the teachings disclosed herein.

FIG. 6 is a flowchart 600 of a method of wireless communication. The method 600 may be performed by a UE (e.g., the UE 104, the UE 350, the UE 404, the apparatus 702/702', and/or the processing system 814, which may include the memory 360 and which may be the entire UE 350 or a component of the UE 350, such as the TX processor 368, the RX processor 356, and/or the controller/processor 359). Optional aspects are illustrated with a dashed line.

The flowchart 600 of FIG. 6 is a method of wireless communication that facilitates improving performance of channel state feedback by implementing sub-selection of resources for CSI selection and resulting in increased power/cycle savings.

At 602, the UE may detect a CSI report triggering event, as described in connection with, for example, the detecting of the CSI report triggering event 420 of FIG. 4. For example, a detection component 708 of apparatus 702 may facilitate the detecting of the CSI report triggering event. In some examples, the CSI report triggering event may include the receiving of at least one of an NZP CSI-RS for a CMR, a CSI-IM for IMR, or a NZP CSI-RS for an IMR. In some examples, the CSI report triggering event may include determining the UE is configured with a plurality of resources.

At 604, the UE may select, after the detecting of the CSI report triggering event, a subset of resources from a set of resources configured for the UE, as described in connection with, for example, the performing of the first sub-selection 430 or the performing of the second sub-selection 440 of FIG. 4. For example, a CSI-RS resource selection component 710 may facilitate selecting a subset of CSI-RS resources from a set of CSI-RS resources configured for the UE. In some examples, the UE may select the subset of resources by applying at least one of an RSRP threshold or an SINR threshold to certain of the resources.

For example, at 606, the UE may select the subset of resources by applying the RSRP threshold, as described in connection with, for example, the performing of the first sub-selection 430 of FIG. 4. For example, an RSRP component 716 and the CSI-RS resource selection component 710 may facilitate the selecting of the subset of resources by applying the RSRP threshold.

In certain such examples, at 608, the UE may measure an RSRP for each resource. For example, the RSRP component 716 may facilitate the measuring of an RSRP for each CSI-RS resources of the set of CSI-RS resources. At 610, the UE may compare each measured RSRP to the RSRP threshold. For example, the RSRP component 716 may facilitate the comparing of each measured RSRP to the RSRP threshold. In some examples, the RSRP threshold may be a dynamic value that varies based on channel characteristics. In some examples, the RSRP threshold may be a relative value based on a percentage of a total received power associated with the resources of the set of resources. In some examples, the RSRP threshold may be a predetermined value. At 612, the UE may select the respective resources with a measured RSRP that satisfy the RSRP threshold. For example, the CSI-RS resource selection component 710 may facilitate the selecting of the respective resources that satisfy the RSRP threshold.

In some examples, at 614, the UE may select the subset of resources by applying the SINR threshold, as described in connection with, for example, the performing of the second sub-selection 440 of FIG. 4. For example, an SINR component 718 and the CSI-RS resource selection component 710 may facilitate the selecting of the subset of resources by applying the SINR threshold.

In certain such examples, at 616, the UE may measure an SINR for each resource. For example, the SINR component 718 may facilitate the measuring of an SINR for each CSI-RS resources of the set of CSI-RS resources. At 618, the UE may compare each measured SINR to the SINR threshold. For example, the SINR component 718 may facilitate the comparing of each measured SINR to the SINR threshold. In some examples, the SINR threshold may be a dynamic value that varies based on channel characteristics. In some examples, the SINR threshold may be a relative value based on a percentage of a maximum SINR associated with the resources of the set of resources. In some examples, the SINR threshold may be a predetermined value. At 620, the UE may select the respective resources with a measured SINR that satisfy the SINR threshold. For example, the CSI-RS resource selection component 710 may facilitate the selecting of the respective resources that satisfy the SINR threshold.

It should be appreciated that in some examples, the UE may select the subset of resources by applying the RSRP threshold and the SINR threshold to the set of resources and/or a first subset of the resources. For example, the CSI-RS resource selection component 710 may facilitate determining a first subset by applying the RSRP threshold to each of the CSI-RS resources of the set of CSI-RS resources and determining a second subset by applying the SINR threshold to each of the CSI-RS resources of the first subset. In additional or alternative examples, the CSI-RS resource selection component 710 may facilitate determining a first subset by applying the SINR threshold to each of the CSI-RS resources of the set of CSI-RS resources and determining a second subset by applying the RSRP threshold to each of the CSI-RS resources of the first subset.

At 622, the UE may select a resource from the subset of resources, as described in connection with, for example, the selecting of the resource from the remaining resources 450 of FIG. 4. For example, the CSI-RS resource selection component 710 may facilitate the selecting of a CSI-RS resources from the subset of CSI-RS resources based on an efficiency metric associated with each of the CSI-RS resources of the subset of CSI-RS resources.

In some examples, the UE may select the resource based on a spectral efficiency associated with each of the remaining resources. For example, at 624, the UE may determine a spectral efficiency for each resource of the subset of resources. For example, a spectral efficiency component 720 may facilitate the determining of the spectral efficiency for reach remaining resource. At 626, the UE may select a resource associated with the highest determined spectral efficiency. For example, the CSI-RS resource selection component 710 may facilitate the selecting of the CSI-RS resource associated with the highest determined spectral efficiency. At 628, the UE may map the respective spectral efficiency to the CSI for the selected resource. For example, a map component 722 may facilitate the mapping of the respective spectral efficiency to the CQI for the selected CSI-RS resource.

At 630, the UE may transmit a CSI report to a base station, as described in connection with, for example, the CSI report 460 of FIG. 4. For example, a report component 714 may facilitate the transmitting of a CSI report to a base station. In certain such examples, the CSI report may include a CQI associated with the selected CSI-RS resource and at least one of a PMI, an RI, or a wideband component of the PMI.

Figure 7:
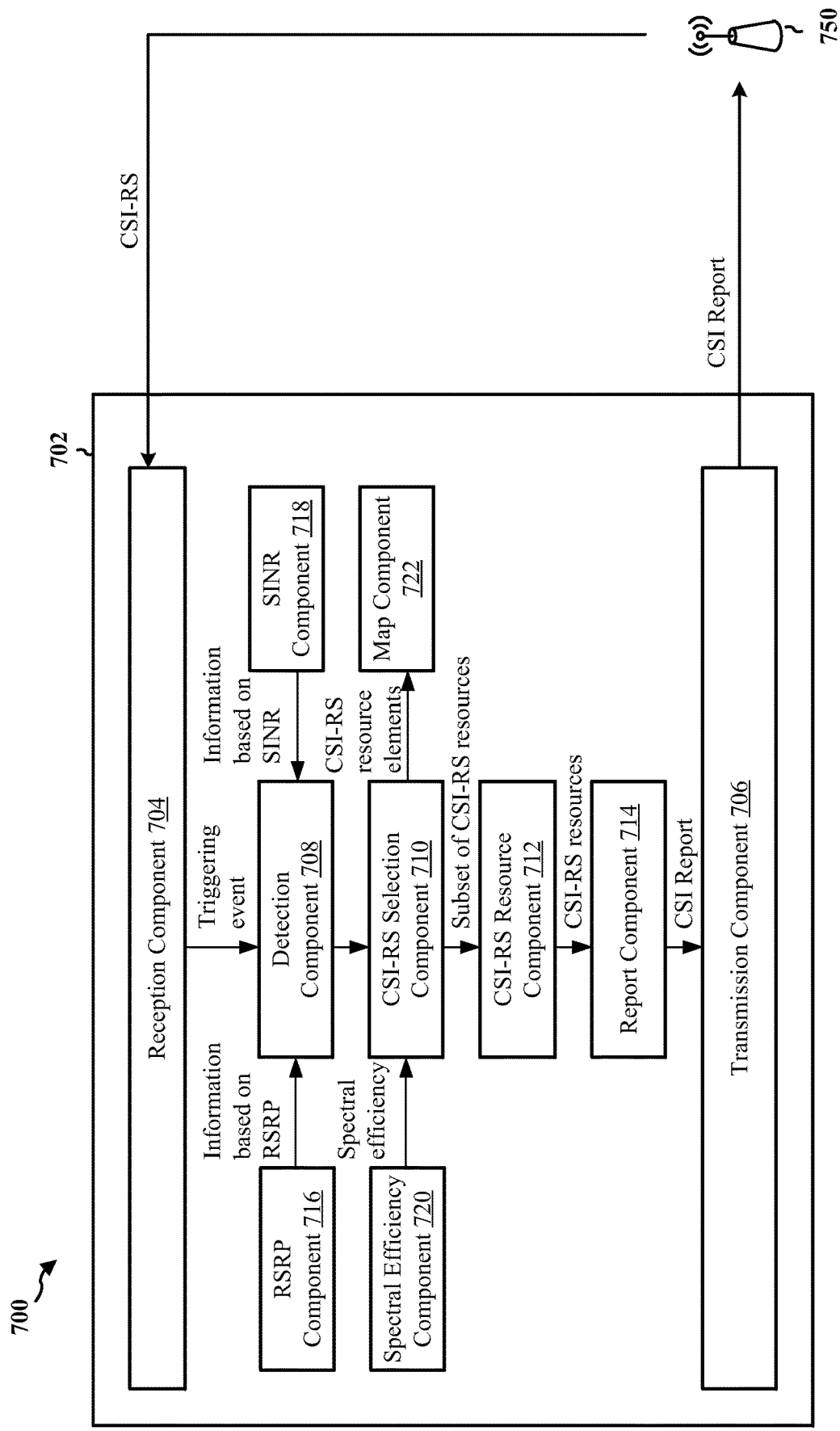
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE or a component of a UE. The apparatus includes a reception component 704 that receives downlink communication from base station 750 and a transmission component 706 that transmits uplink communication to the base station 750. The apparatus may include a detection component 708 configured to detect a CSI report triggering event, e.g., such as any of receiving at least one of an NZP CSI-RS for a CMR, a CSI-IM for IMR, or a NZP CSI-RS for an IMR. The apparatus may comprise a CSI-RS resource selection component 710 configured to select a subset of CSI-RS resources from a set of CSI-RS resources configured for the UE by applying at least one of an RSRP threshold or an SINR threshold to each CSI-RS resource of the set of CSI-RS resources, after detecting a CSI report triggering event. The apparatus may include a CSI-RS resource selection component 712 selecting a CSI-RS resource from the subset of CSI-RS resources based on an efficiency metric associated with each of the CSI-RS resources of the subset of CSI-RS resources. The apparatus may include a spectral efficiency component 720 configured to determine a spectral efficiency for each CSI-RS resource of the subset of CSI-RS resources, and the CSI-RS resource selection component 712 may select a CSI-RS resource associated with the highest determined spectral efficiency. The apparatus may include map component 722 configured to map the respective spectral efficiency to the CQI for the selected CSI-RS resource. The apparatus may include an RSRP component 716 configured to measure an RSRP for each CSI-RS resource of the set of CSI-RS resources and/or compare each measured RSRP to the RSRP threshold. The CSI-RS resource selection component 710 may select CSI-RS resources with a measured RSRP that satisfy the RSRP threshold. The apparatus may include an SINR component 718 configured to measure an SINR for each CSI-RS resource of the set of CSI-RS resources and/or compare each measured SINR to the SINR threshold. The CSI-RS resource selection component 710 may select CSI-RS resources with a measured SINR that satisfy the SINR threshold. The CSI-RS resource selection component 710 may determine a first subset by applying the RSRP threshold to each of the CSI-RS resources of the set of CSI-RS resources and determine a second subset by applying the SINR threshold to each of the CSI-RS resources of the first subset. The CSI-RS resource selection component 710 may determine a first subset by applying the SINR threshold to each of the CSI-RS resources of the set of CSI-RS resources and determine a second subset by applying the RSRP threshold to each of the CSI-RS resources of the first subset. The apparatus may include report component 714 configured to transmit a CSI report to a base station, the CSI report including a CQI associated with the selected CSI-RS resource and at least one of a PMI, an RI, or a wideband component of the PMI.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
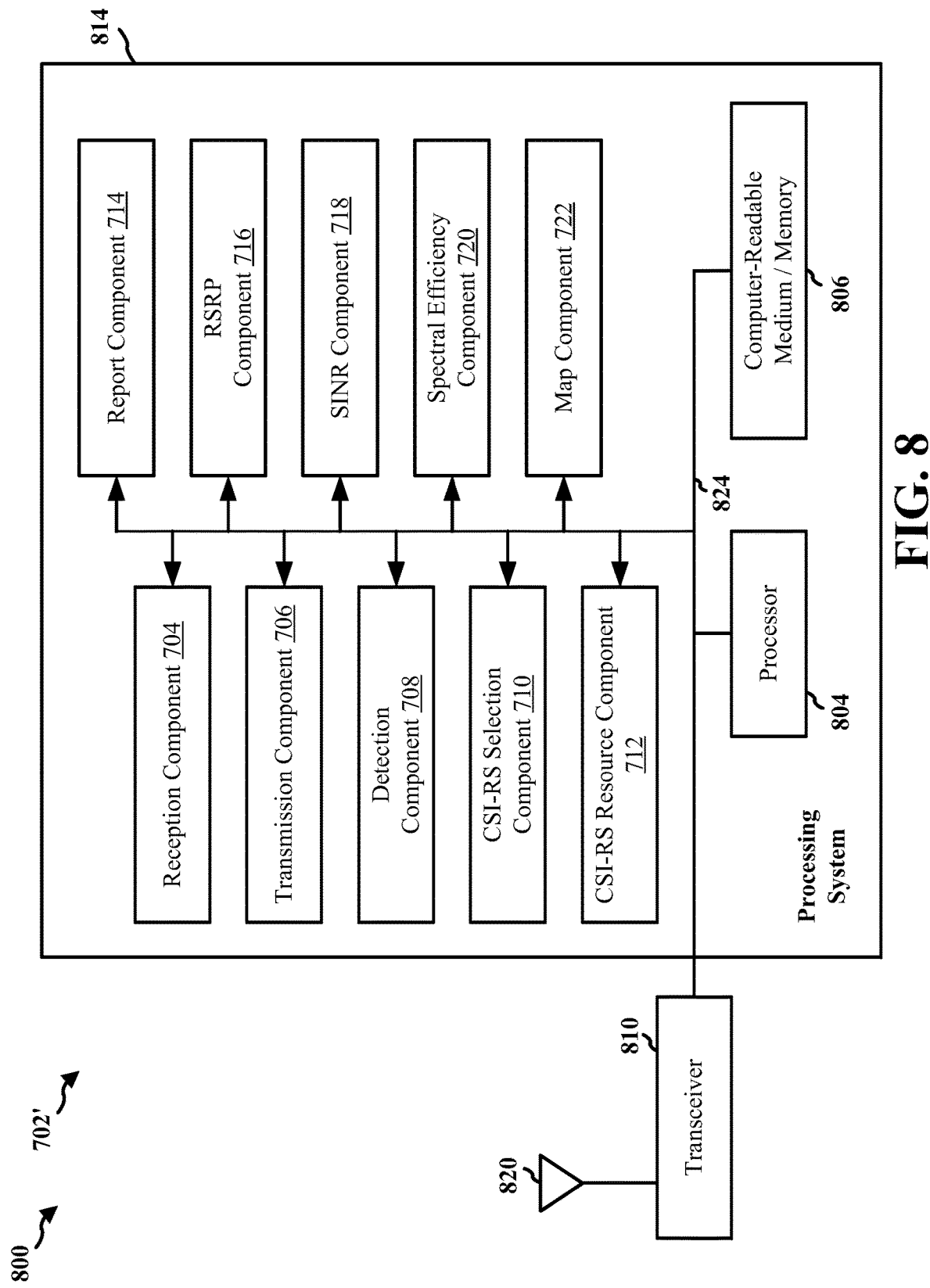
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, 722, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720, 722. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see the UE 350 of FIG. 3).

In one configuration, the apparatus 702/702' for wireless communication includes means for selecting a subset of CSI-RS resources from a set of CSI-RS resources configured for the UE by applying at least one of an RSRP threshold or an SINR threshold to each CSI-RS resource of the set of CSI-RS resources, detecting a CSI report triggering event. The CSI report triggering event may include any of receiving at least one of an NZP CSI-RS for a CMR, a CSI-IM for IMR, or a NZP CSI-RS for an IMR. The apparatus may include means for selecting a CSI-RS resource from the subset of CSI-RS resources based on an efficiency metric associated with each of the CSI-RS resources of the subset of CSI-RS resources. The apparatus may include means for determining a spectral efficiency for each CSI-RS resource of the subset of CSI-RS resources, wherein the means for selecting a CSI-RS resource may select an associated with the highest determined spectral efficiency. The apparatus may include means for mapping the respective spectral efficiency to the CQI for the selected CSI-RS resource. The apparatus may include means for measuring an RSRP for each CSI-RS resource of the set of CSI-RS resources and comparing each measured RSRP to the RSRP threshold. The means for selecting the respective CSI-RS resources may select CSI-RS resources with a measured RSRP that satisfy the RSRP threshold. The apparatus may include means for measuring an SINR for each CSI-RS resource of the set of CSI-RS resources and comparing each measured SINR to the SINR threshold. The means for selecting the respective CSI-RS resources may select CSI-RS resources with a measured SINR that satisfy the SINR threshold. The means for selecting of the subset of CSI-RS resources may determine a first subset by applying the RSRP threshold to each of the CSI-RS resources of the set of CSI-RS resources determine a second subset by applying the SINR threshold to each of the CSI-RS resources of the first subset. The means for selecting of the subset of CSI-RS resources may determine a first subset by applying the SINR threshold to each of the CSI-RS resources of the set of CSI-RS resources and determine a second subset by applying the RSRP threshold to each of the CSI-RS resources of the first subset. The apparatus may include means for transmitting a CSI report to a base station, the CSI report including a CQI associated with the selected CSI-RS and at least one of a PMI, an RI, or a wideband component of the PMI. The aforementioned means may be one or more of the aforementioned components of the apparatus 702 and/or processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    detecting a channel state information (CSI) report triggering event, wherein a set of CSI reference signal (CSI-RS) resources are configured from which a CSI-RS resource is to be selected for CSI reporting based on an efficiency metric;
    measuring each CSI-RS resource of the set of CSI-RS resources based on at least one of a reference signal received power (RSRP) or a signal to interference and noise ratio (SINR);
    applying a first threshold to each CSI-RS resource in the set of CSI-RS resources to select a first subset of CSI-RS resources that satisfy the first threshold and to discard CSI-RS resources remaining in the set of CSI-RS resources that do not satisfy the first threshold;
    applying a second threshold to each CSI-RS resource remaining in the first subset of CSI-RS resources based on the first threshold to select a second subset of CSI-RS resources that satisfy the second threshold and to discard CSI-RS resources remaining in the first subset of CSI-RS resources that do not satisfy the second threshold;
    calculating the efficiency metric for each CSI-RS resource remaining in the second subset of CSI-RS resources;
    selecting the CSI-RS resource from the second subset of CSI-RS resources based on the efficiency metric associated with each CSI-RS resource in the second subset of CSI-RS resources; and
    transmitting a CSI report to a base station, the CSI report including a channel quality indicator (CQI) associated with the selected CSI-RS resource and at least one of a precoding matrix indicator (PMI), a rank indication (RI), or a wideband component of the PMI.

2. The method of claim 1, wherein the CSI report triggering event includes receiving at least one of a non-zero power CSI-RS for a channel measurement resource (CMR), a CSI interference measurement (CSI-IM) for an interference measurement resource (IMR), or a non-zero power CSI-RS for an interference measurement resource.

3. The method of claim 1, wherein calculating the efficiency metric comprises obtaining a spectral efficiency measurement of each measured CSI-RS resource remaining in the second subset of CSI-RS resources, and wherein the selecting of the CSI-RS resource from the second subset of CSI-RS resources further includes mapping the spectral efficiency measurement to the CQI for the selected CSI-RS resource, wherein the efficiency metric of the selected CSI-RS resource indicates that the selected CSI-RS resource is associated with a highest spectral efficiency.

4. The method of claim 1, wherein the second threshold corresponds to a RSRP threshold, wherein the selecting of the second subset of CSI-RS resources further includes:
    comparing each measured RSRP to the RSRP threshold; and
    selecting the respective CSI-RS resources with a measured RSRP that satisfy the RSRP threshold.

5. The method of claim 1, wherein the second threshold corresponds to a SINR threshold, wherein the selecting of the second subset of CSI-RS resources further includes:
    comparing each measured SINR to the SINR threshold; and
    selecting respective CSI-RS resources with a measured SINR that satisfy the SINR threshold.

6. The method of claim 1, wherein the first threshold corresponds to a RSRP threshold and the second threshold corresponds to a SINR threshold, wherein:
    the first subset is determined by applying the RSRP threshold to each of the CSI-RS resources of the set of CSI-RS resources; and
    the second subset is determined by applying the SINR threshold to each of the CSI-RS resources of the first subset.

7. The method of claim 1, wherein the first threshold corresponds to a SINR threshold and the second threshold corresponds to a RSRP threshold, wherein:
    the first subset is determined by applying the SINR threshold to each of the CSI-RS resources of the set of CSI-RS resources; and
    the second subset is determined by applying the RSRP threshold to each of the CSI-RS resources of the first subset.

8. The method of claim 1, wherein the first threshold or the second threshold corresponds to a RSRP threshold, wherein the RSRP threshold is a dynamic value that varies based on channel characteristics.

9. The method of claim 1, wherein the first threshold or the second threshold corresponds to a RSRP threshold, wherein the RSRP threshold is a relative value based on a percentage of a total received power associated with the CSI-RS resources of the set of CSI-RS resources.

10. The method of claim 1, wherein the first threshold or the second threshold corresponds to a SINR threshold, wherein the SINR threshold is a dynamic value that varies based on channel characteristics.

11. The method of claim 1, wherein the first threshold or the second threshold corresponds to a SINR threshold, wherein the SINR threshold is a relative value based on a maximum SINR associated with the CSI-RS resources of the set of CSI-RS resources.

12. An apparatus of wireless communication, comprising:
means for detecting, at a user equipment (UE), a channel state information (CSI) report triggering event, wherein a set of CSI reference signal (CSI-RS) resources are configured from which a CSI-RS resource is to be selected for CSI reporting based on an efficiency metric;
means for measuring each CSI-RS resource of the set of CSI-RS resources based on at least one of a reference signal received power (RSRP) or a signal to interference and noise ratio (SINR);
means for applying a first threshold to each CSI-RS resource in the set of CSI-RS resources to select a first subset of CSI-RS resources that satisfy the first threshold and to discard CSI-RS resources remaining in the set of CSI-RS resources that do not satisfy the first threshold;
means for applying a second threshold to each CSI-RS resource remaining in the first subset of CSI-RS resources based on the first threshold to select a second subset of CSI-RS resources that satisfy the second threshold and to discard CSI-RS resources remaining in the first subset of CSI-RS resources that do not satisfy the second threshold;
means for calculating the efficiency metric for each CSI-RS resource remaining in the second subset of CSI-RS resources;
means for selecting the CSI-RS resource from the second subset of CSI-RS resources based on the efficiency metric associated with each CSI-RS resource in the second subset of CSI-RS resources; and
means for transmitting a CSI report to a base station, the CSI report including a channel quality indicator (CQI) associated with the selected CSI-RS resource and at least one of a precoding matrix indicator (PMI), a rank indication (RI), or a wideband component of the PMI.

13. The apparatus of claim 12, wherein the means for detecting the CSI report triggering event further includes means for receiving at least one of a non-zero power CSI-RS for a channel measurement resource (CMR), a CSI interference measurement (CSI-IM) for an interference measurement resource (IMR), or a non-zero power CSI-RS for an interference measurement resource.

14. The apparatus of claim 12, wherein the means for calculating the efficiency metric is further configured to obtain a spectral efficiency measurement of each measured CSI-RS resource remaining in the second subset of CSI-RS resources, and wherein the means for selecting the CSI-RS resource from the second subset of CSI-RS resources further includes means for mapping the spectral efficiency measurement to the CQI for the selected CSI-RS resource, wherein the efficiency metric of the selected CSI-RS resource indicates that the selected CSI-RS resource is associated with a highest spectral efficiency.

15. The apparatus of claim 12, wherein the second threshold corresponds to a RSRP threshold, wherein the means for selecting the second subset of CSI-RS resources further includes:
means for comparing each measured RSRP to the RSRP threshold; and
means for selecting the respective CSI-RS resources with a measured RSRP that satisfy the RSRP threshold.

16. The apparatus of claim 12, wherein the second threshold corresponds to a SINR threshold, wherein the means for selecting the second subset of CSI-RS resources further includes:
means for comparing each measured SINR to the SINR threshold; and
means for selecting respective CSI-RS resources with a measured SINR that satisfy the SINR threshold.

17. The apparatus of claim 12, wherein the first threshold corresponds to a RSRP threshold and the second threshold corresponds to a SINR threshold, wherein:
the first subset is determined by applying the RSRP threshold to each of the CSI-RS resources of the set of CSI-RS resources; and
the second subset is determined by applying the SINR threshold to each of the CSI-RS resources of the first subset.

18. The apparatus of claim 12, wherein the first threshold corresponds to a SINR threshold and the second threshold corresponds to a RSRP threshold, wherein:
the first subset is determined by applying the SINR threshold to each of the CSI-RS resources of the set of CSI-RS resources; and
the second subset is determined by applying the RSRP threshold to each of the CSI-RS resources of the first subset.

19. An apparatus of wireless communication, comprising:
a memory; and
at least one processor coupled to the memory and configured to:
detect a channel state information (CSI) report triggering event, wherein a set of CSI reference signal (CSI-RS) resources are configured from which a CSI-RS resource is to be selected for CSI reporting based on an efficiency metric;
measure each CSI-RS resource of the set of CSI-RS resources based on at least one of a reference signal received power (RSRP) or a signal to interference and noise ratio (SINR);
applying a first threshold to each CSI-RS resource in the set of CSI-RS resources to select a first subset of CSI-RS resources that satisfy the first threshold and to discard CSI-RS resources remaining in the set of CSI-RS resources that do not satisfy the first threshold;
applying a second threshold to each CSI-RS resource remaining in the first subset of CSI-RS resources based on the first threshold to select a second subset of CSI-RS resources that satisfy the second threshold and to discard CSI-RS resources remaining in the first subset of CSI-RS resources that do not satisfy the second threshold;
calculate the efficiency metric for each CSI-RS resource remaining in the second subset of CSI-RS resources;
select the CSI-RS resource from the second subset of CSI-RS resources based on the efficiency metric associated with each CSI-RS resource in the second subset of CSI-RS resources; and
transmit a CSI report to a base station, the CSI report including a channel quality indicator (CQI) associated with the selected CSI-RS resource and at least one of a precoding matrix indicator (PMI), a rank indication (RI), or a wideband component of the PMI.

20. The apparatus of claim 19, wherein the CSI report triggering event includes receiving at least one of a non-zero power CSI-RS for a channel measurement resource (CMR), a CSI interference measurement (CSI-IM) for an interference measurement resource (IMR), or a non-zero power CSI-RS for an interference measurement resource.

21. The apparatus of claim 19, wherein the at least one processor configured to calculate the efficiency metric is further configured to obtain a spectral efficiency measurement of each measured CSI-RS resource remaining in the second subset of CSI-RS resources, and wherein the at least one processor configured to select the CSI-RS resource from the second subset of CSI-RS resources is further configured to map the spectral efficiency measurement to the CQI for the selected CSI-RS resource, wherein the efficiency metric of the selected CSI-RS resource indicates that the selected CSI-RS resource is associated with a highest spectral efficiency.

22. The apparatus of claim 19, wherein the second threshold corresponds to a RSRP threshold, wherein the at least one processor is further configured to select the second subset of CSI-RS resources by:
comparing each measured RSRP to the RSRP threshold; and
selecting the respective CSI-RS resources with a measured RSRP that satisfy the RSRP threshold.

23. The apparatus of claim 19, wherein the second threshold corresponds to a SINR threshold, wherein the at least one processor is further configured to select the second subset of CSI-RS resources by:
comparing each measured SINR to the SINR threshold; and
selecting respective CSI-RS resources with a measured SINR that satisfy the SINR threshold.

24. The apparatus of claim 19, wherein the first threshold corresponds to a RSRP threshold and the second threshold corresponds to a SINR threshold, wherein:
the first subset is determined by applying the RSRP threshold to each of the CSI-RS resources of the set of CSI-RS resources; and
the second subset is determined by applying the SINR threshold to each of the CSI-RS resources of the first subset.

25. The apparatus of claim 19, wherein the first threshold corresponds to a SINR threshold and the second threshold corresponds to a RSRP threshold, wherein:
the first subset is determined by applying the SINR threshold to each of the CSI-RS resources of the set of CSI-RS resources; and
the second subset is determined by applying the RSRP threshold to each of the CSI-RS resources of the first subset.

26. The apparatus of claim 19, wherein the first threshold or the second threshold corresponds to a RSRP threshold, wherein the RSRP threshold is a dynamic value that varies based on channel characteristics.

27. The apparatus of claim 19, wherein the first threshold or the second threshold corresponds to a RSRP threshold, wherein the RSRP threshold is a relative value based on a percentage of a total received power associated with the CSI-RS resources of the set of CSI-RS resources.

28. The apparatus of claim 19, wherein the first threshold or the second threshold corresponds to a SINR threshold, wherein the SINR threshold is a dynamic value that varies based on channel characteristics.

29. The apparatus of claim 19, wherein the first threshold or the second threshold corresponds to a SINR threshold, wherein the SINR threshold is a relative value based on a maximum SINR associated with the CSI-RS resources of the set of CSI-RS resources.

30. A non-transitory computer-readable medium storing computer executable code for wireless communication at a user equipment (UE), comprising code to:
detect a channel state information (CSI) report triggering event, wherein a set of CSI reference signal (CSI-RS) resources are configured from which a CSI-RS resource is to be selected for CSI reporting based on an efficiency metric;
measure each CSI-RS resource of the set of CSI-RS resources based on at least one of a reference signal received power (RSRP) or a signal to interference and noise ratio (SINR);
applying a first threshold to each CSI-RS resource in the set of CSI-RS resources to select a first subset of CSI-RS resources that satisfy the first threshold and to discard CSI-RS resources remaining in the set of CSI-RS resources that do not satisfy the first threshold;
applying a second threshold to each CSI-RS resource remaining in the first subset of CSI-RS resources based on the first threshold to select a second subset of CSI-RS resources that satisfy the second threshold and to discard CSI-RS resources remaining in the first subset of CSI-RS resources that do not satisfy the second threshold;
calculate the efficiency metric for each CSI-RS resource remaining in the second subset of CSI-RS resources;
select the CSI-RS resource from the second subset of CSI-RS resources based on the efficiency metric associated with each CSI-RS resource in the second subset of CSI-RS resources; and
transmit a CSI report to a base station, the CSI report including a channel quality indicator (CQI) associated with the selected CSI-RS resource and at least one of a precoding matrix indicator (PMI), a rank indication (RI), or a wideband component of the PMI.

* * * * *